(12) United States Patent
Upadhyay et al.

(10) Patent No.: US 7,418,816 B2
(45) Date of Patent: Sep. 2, 2008

(54) EXHAUST GAS AFTERTREATMENT SYSTEMS

(75) Inventors: Devesh Upadhyay, Canton, MI (US); David J. Kubinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 11/217,999

(22) Filed: Sep. 1, 2005

(65) Prior Publication Data

US 2007/0044457 A1    Mar. 1, 2007

(51) Int. Cl.
*F01N 3/00* (2006.01)
(52) U.S. Cl. ............... 60/285; 60/274; 60/277; 60/286; 60/295
(58) Field of Classification Search ............ 60/274, 60/277, 285, 286, 295
See application file for complete search history.

(56) References Cited

U.S. PATENT DOCUMENTS

| | | | | |
|---|---|---|---|---|
| 6,069,013 | A | 5/2000 | Plog et al. | |
| 6,092,367 | A | 7/2000 | Dolling | |
| 6,125,629 | A * | 10/2000 | Patchett | 60/286 |
| 6,192,675 | B1 * | 2/2001 | Hirota et al. | 60/286 |
| 6,240,722 | B1 | 6/2001 | Busch et al. | |
| 6,698,191 | B2 * | 3/2004 | Xu et al. | 60/286 |
| 6,732,507 | B1 * | 5/2004 | Stanglmaier et al. | 60/285 |
| 6,742,326 | B2 * | 6/2004 | Xu et al. | 60/284 |
| 6,755,014 | B2 * | 6/2004 | Kawai et al. | 60/286 |
| 6,823,663 | B2 * | 11/2004 | Hammerle et al. | 60/286 |
| 6,834,498 | B2 | 12/2004 | van Nieuwstadt et al. | |
| 6,871,489 | B2 * | 3/2005 | Tumati et al. | 60/285 |
| 6,882,929 | B2 * | 4/2005 | Liang et al. | 701/115 |
| 6,928,806 | B2 * | 8/2005 | Tennison et al. | 60/286 |
| 6,996,975 | B2 * | 2/2006 | Radhamohan et al. | 60/286 |
| 7,063,642 | B1 * | 6/2006 | Hu et al. | 477/100 |
| 7,093,427 | B2 * | 8/2006 | van Nieuwstadt et al. | 60/286 |
| 7,117,669 | B2 * | 10/2006 | Kaboord et al. | 60/288 |
| 2006/0000202 | A1 * | 1/2006 | Ripper et al. | 60/286 |
| 2006/0130461 | A1 * | 6/2006 | Gabrielsson et al. | 60/286 |
| 2006/0174608 | A1 * | 8/2006 | Hu et al. | 60/286 |

\* cited by examiner

*Primary Examiner*—Thomas Denion
*Assistant Examiner*—Loren Edwards
(74) *Attorney, Agent, or Firm*—Julia Voutyras; Allan J. Lippa (57) ABSTRACT

A method is presented for determining an amount of reductant stored in the catalyst by intrusively desorbing a portion of reductant and monitoring the response of a reductant sensor to the desorbed portion. The desorbtion can be performed at vehicle start-up to determine initial storage amount and to adjust reductant injection accordingly to achieve optimum storage. Additionally, a portion of reductant can be desorbed when NOx conversion efficiency of the catalyst is reduced in order to diagnose the component responsible for system degradation.

7 Claims, 8 Drawing Sheets

EXHAUST GAS AFTERTREATMENT SYSTEMS

FIELD OF INVENTION

The present invention relates to an emission control system for diesel and other lean-burn vehicles and, more specifically, to determining an amount of reductant stored in a NOx-reducing catalyst.

BACKGROUND AND SUMMARY OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gasses. Vehicles equipped with diesel or other lean burn engines offer the benefit of increased fuel economy. However, catalytic reduction of NOx emissions via conventional means in such systems is difficult due to the high content of oxygen in the exhaust gas.

In this regard, Selective Catalytic Reduction (SCR) catalysts, in which NOx is continuously removed through active injection of a reductant into the exhaust gas mixture entering the catalyst, are known to achieve high NOx conversion efficiency. Urea-based SCR catalysts use gaseous ammonia as the active NOx reducing agent. Typically, an aqueous solution of urea is carried on board of a vehicle, and an injection system is used to supply it into the exhaust gas stream entering the SCR catalyst. The aqueous urea decomposes to hydrocyanic acid (NHCO) and gaseous ammonia ($NH_3$) in the exhaust gas stream. The hydrocyanic acid is catalytically converted to NH3 on the SCR. Ideally, most of the ammonia will be stored in the catalyst for reaction with the incoming NOx. NOx conversion efficiency of an SCR catalyst is improved in the presence of adsorbed ammonia. However, if the amount of ammonia stored in the catalyst is too high, some of it may desorb and slip from the catalyst. Additionally, in the presence of high temperatures, excessive ammonia storage will lead to excessive NOx via oxidation. All of this will lead to a reduction in the overall $NO_X$ conversion efficiency. Therefore, in order to achieve optimal NOx reduction and minimize ammonia slip in a urea-based SCR catalyst, it is important to control the amount of ammonia stored in the SCR catalyst.

A typical prior art system is described in U.S. Pat. No. 6,069,013, wherein a sensor is placed downstream of an SCR catalyst to detect $NH_3$. The sensor is comprised of a low acidity zeolite material of low precious metal content. The a.c. impedance of the sensor is reduced in the presence of $NH_3$.

The inventors herein have recognized a disadvantage with such an approach. In particular, an ammonia sensor placed downstream of the catalyst generates a signal only when there is ammonia slip over the catalyst. Ammonia slip is usually a result of temperature transients or excessive storage. Slip due to excessive storage will be impossible to rectify expediently via any control action. Hence, it is recognized that control action based solely on $NH_3$ sensor feedback is, at best, a delayed corrective action.

Further, the inventors have recognized that the bulk of the ammonia introduced into the catalyst is stored or reduced on the upstream 20-30% of a typically sized catalyst brick on the order of 1 to 2 engine swept volumes. The remaining catalyst volume acts as a buffer to capture slip and allow some transient NOx reduction at high space velocities. Further, inventors have recognized that in order to achieve optimal NOx conversion in the SCR, it is not necessary that all of the catalyst storage capacity be utilized by ammonia. Therefore, it is desirable to either control the amount of ammonia stored in the catalyst to some optimal level below maximum (for a single brick configuration) or to store at higher levels only in the front brick/s for a multi-brick configuration.

The inventors herein have determined an improvement can be achieved by splitting the catalyst brick into at least two parts, wherein the volume of the first brick would be 20-30% of the overall single brick equivalent catalyst volume. The first brick would perform most of the ammonia storage/NOx conversion functions, and the second brick would serve to catch any of the ammonia slipping past the first brick. Thus, inventors have recognized that by controlling the amount of ammonia stored in the first brick, effective control of overall catalyst ammonia storage amounts can be achieved.

Further, inventors herein have devised a method to effectively measure and control the amount of ammonia stored in the catalyst prior to achieving catalyst saturation levels. Namely, the inventors herein have recognized that it is possible to intrusively desorb a portion of the ammonia stored in the catalyst, and to determine the overall amount of ammonia stored based on a reading of an $NH_3$ sensor positioned in the vicinity of the desorbtion area.

Additionally, the inventors herein have recognized that it is possible to effectively diagnose system degradation in catalyst performance by monitoring and controlling the amount of ammonia stored in the catalyst. In particular, inventors have recognized that when NOx conversion efficiency of the catalyst is degraded, and the amount of ammonia storage is below optimal, injection of a predetermined amount of reductant will improve NOx conversion efficiency unless the catalyst is poisoned by hydrocarbons or thermally aged. In other words, the inventors herein have recognized that if NOx conversion efficiency of the catalyst does not improve following injection of ammonia, the catalyst performance may be degraded due to hydrocarbon poisoning and it should be regenerated.

Therefore, in accordance with the present invention, a method is presented for controlling a NOx-reducing catalyst, the method including: intrusively desorbing a portion of reductant stored in the catalyst; adjusting reductant injection into the catalyst based on an amount of reductant intrusively desorbed; and regenerating the catalyst when NOx conversion efficiency of the catalyst remains below a predetermined value for a predetermined amount of time following said reductant injection adjustment.

In yet another embodiment of the present invention, a diagnostic system, includes: an engine; a catalyst coupled downstream of said engine, including: a first catalyst brick, said brick having a heated portion; and a sensor coupled in close proximity to said heated portion; and a controller adjusting a temperature of said heated portion of said first catalyst brick to desorb reductant stored on said heated portion, said controller adjusting an amount of reductant in an exhaust gas mixture entering said catalyst based on a response of said sensor to said desorbed reductant; and providing an indication of catalyst degradation if an amount of an exhaust gas component downstream of said catalyst remains above a predetermined value for a predetermined time following said controller adjusting said amount of reductant entering said catalyst.

An advantage of the present invention is improved emission control. Another advantage of the present invention is improved vehicle diagnostic capabilities.

The above advantages and other advantages, and features of the present invention will be readily apparent from the following detailed description of the preferred embodiments when taken in connection with the accompanying drawings and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
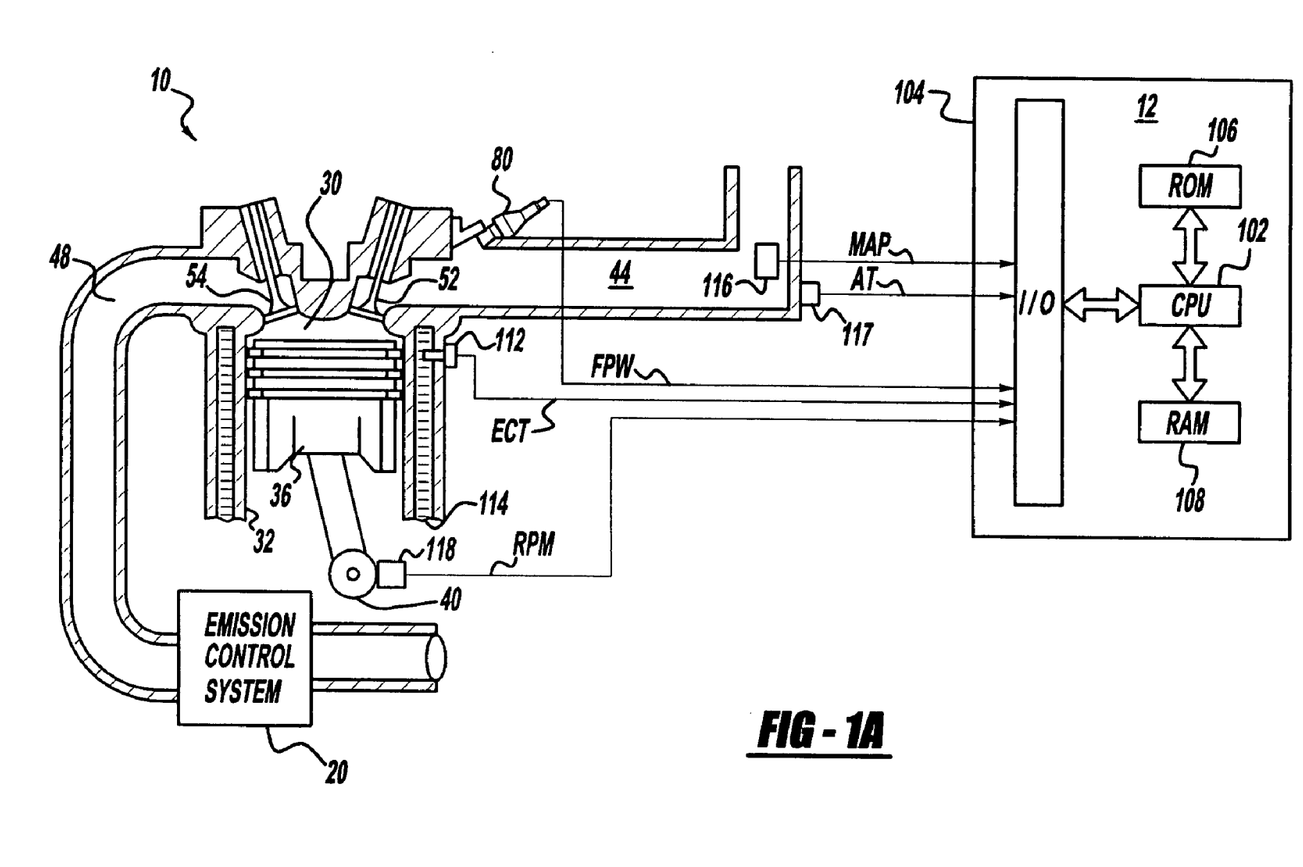
FIGS. 1A and 1B are schematic diagrams of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown) including a fuel tank, fuel pump, and fuel rail (not shown).

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20, coupled to an exhaust manifold 48, is described in detail in FIG. 2 below.

Figure 1B:
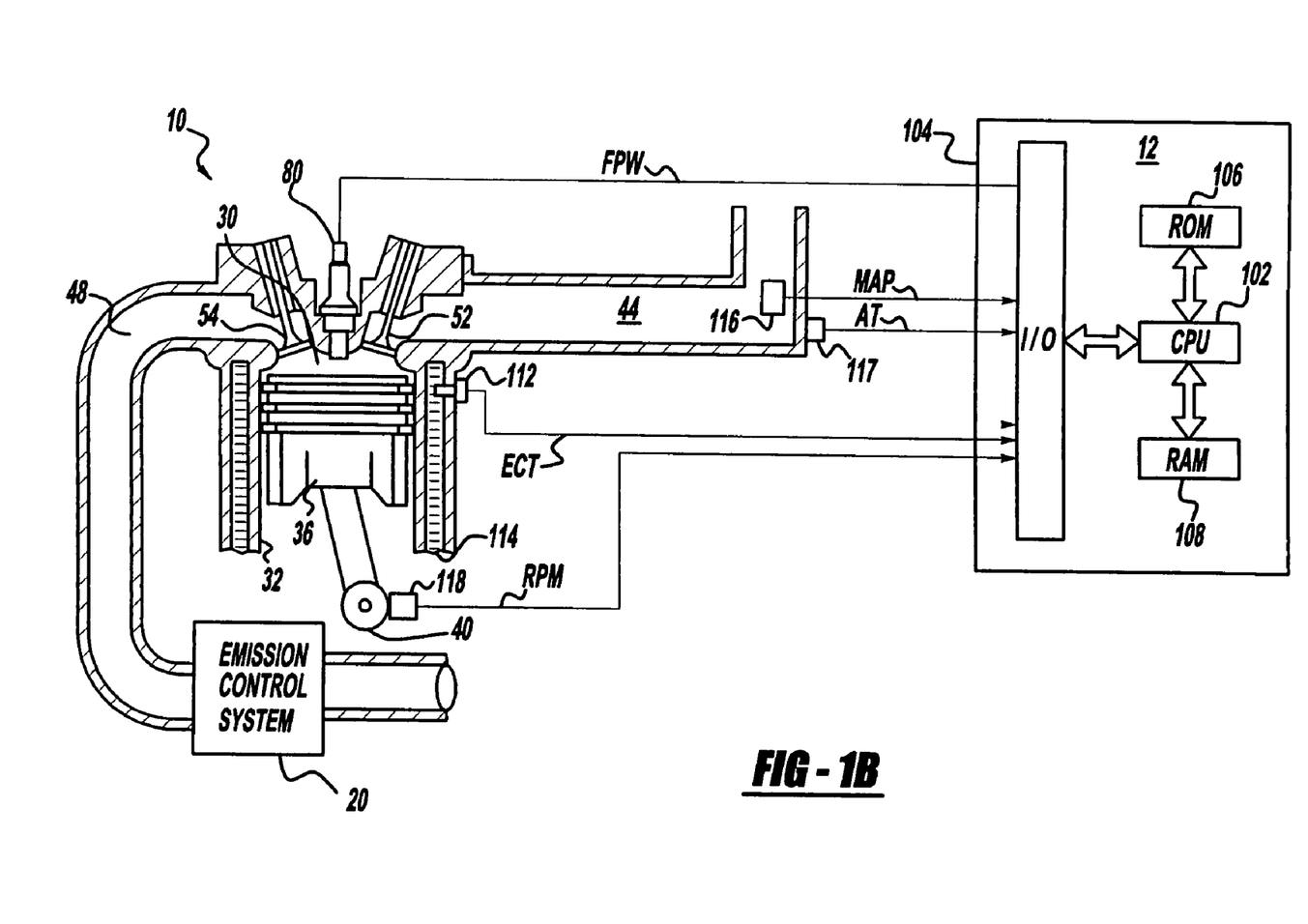

Referring now to FIG. 1B, an alternative embodiment is shown where engine 10 is a direct injection engine with injector 80 located to inject fuel directly into cylinder 30.

Figure 2:
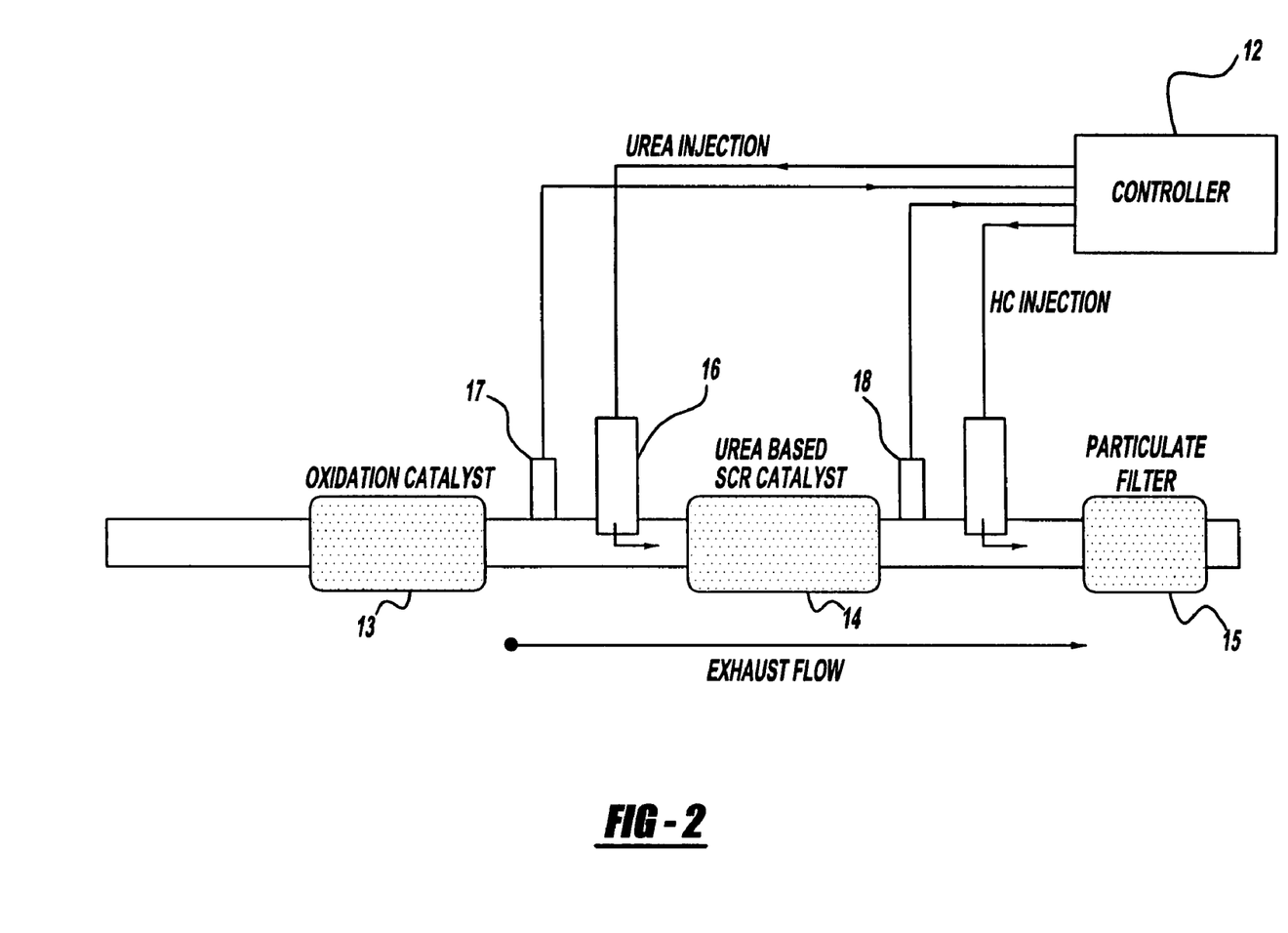
FIG. 2 is a schematic diagram of an emission control system, wherein the invention is used to advantage.

Referring now to FIG. 2, an example of an emission control system in accordance with the present invention is described. Emission control system 20 is coupled downstream of an internal combustion engine 10 described with particular reference in FIG. 1.

Catalyst 14 is a NOx-reducing catalyst wherein NOx is continuously removed through active injection of a reductant into the exhaust gas mixture entering the catalyst. In a preferred embodiment, catalyst 14 is a urea based Selective Catalytic Reduction (SCR) catalyst in which NOx is reduced through active injection of an aqueous urea solution or other nitrogen-based reductant into the exhaust gas entering the device. The urea solution is converted into hydro cyanic acid (NHCO) and gaseous ammonia ($NH_3$) prior to entering the SCR catalyst, wherein $NH_3$ serves an active NOx reducing agent in the SCR.

In a preferred embodiment, the SCR catalyst is a base metal/zeolite formulation with optimum NOx conversion performance in the temperature range of 200-500° C. Oxidation catalyst 13 is coupled upstream of the SCR catalyst and may be a precious metal catalyst, preferably one containing Platinum for high conversion of hydrocarbons and carbon monoxide. The oxidation catalyst exothermically combusts hydrocarbons (HC) in the incoming exhaust gas from the engine thus supplying heat to rapidly warm up the SCR catalyst 14. Particulate filter 15 is coupled downstream of the SCR catalyst for storing soot.

A reductant delivery system 16 is coupled to the exhaust gas manifold between the oxidation catalyst and the SCR catalyst. System 16 may be any reductant delivery system known to those skilled in the art. In a preferred embodiment, system 16 is that described in U.S. Pat. No. 6,834,498, issued Dec. 28, 2004, assigned to the same assignee as the present invention, the subject matter thereof being incorporated herein by reference. In such system, air and reductant are injected into the reductant delivery system, where they are vaporized by the heated element and the resulting vapor is introduced into the exhaust gas mixture entering the SCR catalyst.

A pair of NOx sensors 17, 18 is provided upstream and downstream of the SCR catalyst, respectively. Measurements of the concentration of NOx in the exhaust gas mixture upstream ($C_{NOx\_in}$) and downstream ($C_{NOx\_out}$) of the SCR catalyst 14 provided by the NOx sensors are fed to controller 12. Controller 12 calculates NOx conversion efficiency of the catalyst, $NOx_{eff}$. In a preferred embodiment, since a typical NOx sensor is cross-sensitive to ammonia, sensor 17 is coupled upstream of the reductant delivery system 16. Alternatively, NOx sensor 17 may be eliminated and the amount of NOx in the exhaust gas mixture entering the SCR catalyst may be estimated based on engine speed, load, exhaust gas temperature or any other parameter known to those skilled in the art to affect engine NOx production.

Temperature measurements upstream ($T_u$) and downstream ($T_d$) of the SCR catalyst are provided by temperature sensors (not shown). Controller 12 calculates catalyst temperature, $T_{cat}$, based on the information provided by these sensors. Alternatively, any other means known to those skilled in the art to determine catalyst temperature, such as placing a temperature sensor mid-bed of the catalyst, or estimating catalyst temperature based on engine operating conditions, can be employed.

Figure 3:
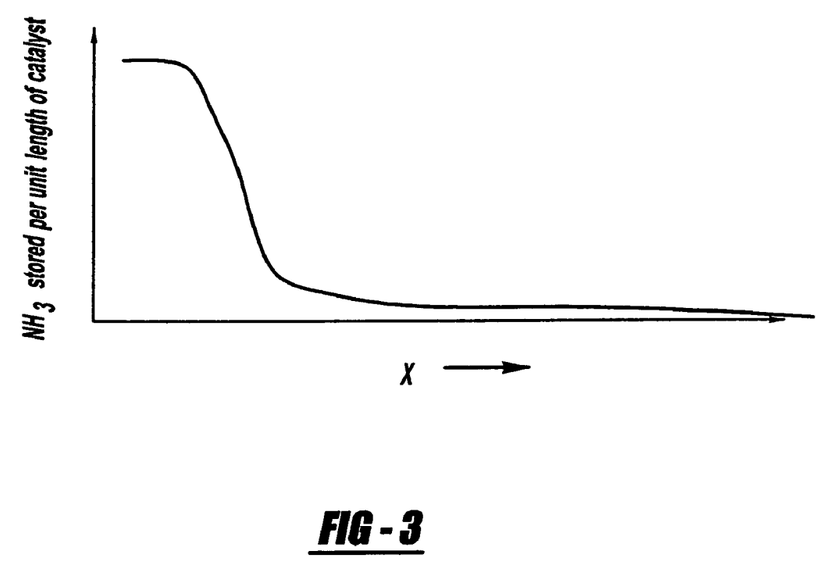
FIG. 3 is a typical plot, under normal operating conditions, of the amount of $NH_3$ stored in a urea SCR catalyst as a function of catalyst axial distance from front face.

Referring now to FIG. 3, is a plot of the amount of $NH_3$ stored in a urea SCR catalyst as a function of axial distance from front face of the catalyst under normal operating conditions. The ammonia storage behavior highlighted by this plot is that the ammonia storage or "fill" is initiated at the front face and progresses to the rear face over time. Hence, storage over an extended duration would cause the plot to ultimately become a flat line with uniform storage over the entire catalyst volume. Ammonia storage as a function of catalyst volume can be determined by multiplying the storage over a catalyst length by the catalyst area up to that length, as follows:

$$m_{NH3}^{ads}(V) = A_{cat} \int_{x1}^{x2} m_{NH3}^{ads}(x) dx$$

where, $A_{cat}$=cross sectional are of catalyst.

$X_1$, $x_2$ define the catalyst length co-ordinates from the front face.

$m_{NH3}^{ads}(x)$=is defined by the storage function as in FIG. 3.

$m_{NH3}^{ads}(V)$=is the cumulative storage in catalyst volume between sections defined by x1 and x2.

As can be determined from FIG. 3, the bulk of the ammonia introduced into the catalyst is stored or reduced on the upstream 20-30% volume of a typically sized catalyst brick on the order of 1 to 2 engine swept volumes. The remaining downstream catalyst volume stores very little ammonia and acts primarily as a buffer to capture slip and allow some transient NOx reduction at high space velocities.

Figure 4:
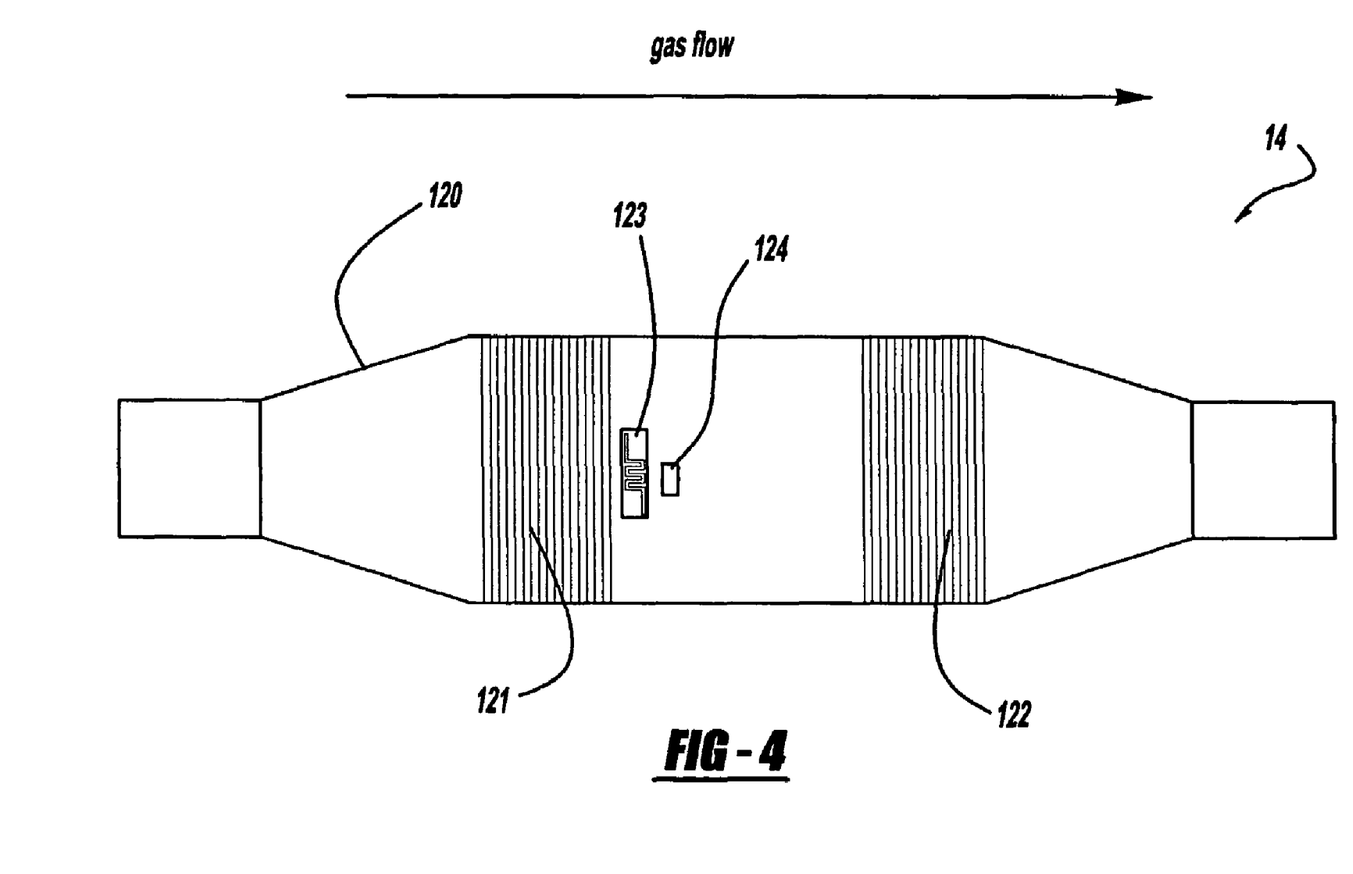
FIGS. 4, and 5 are examples of a NOX-reducing catalyst in accordance with the present invention.

Referring now to FIG. 4, an example of an SCR catalyst system according to the present invention is presented. Catalyst 14 comprises housing 120 wherein SCR catalyst bricks (121, 122) are housed. In a preferred embodiment, brick 121 is approximately 20-30% of overall catalyst volume. Additionally, a small SCR test catalyst brick 123 with an embedded electrical heater is coupled to the housing 120 in close proximity to brick 121. In a preferred embodiment, the brick 123 is approximately 5% of the volume of brick 121. A temperature probe is used to monitor and control the temperature of brick 123 and the rate at which it is being heated up. The maximum heater temperature and its warm-up rate are determined so that enough of ammonia is released from the portion of the brick for the nearby ammonia sensor 124 to reach a predetermined level signal.

In an alternative embodiment, the heater could be turned on for a predetermined amount of time and to a predetermined temperature such that all of the ammonia is presumed desorbed from the heated region. Ammonia sensor 124 may be any conventional $NH_3$ sensor known to those skilled in the art, such as the one described in U. S. Pat. No. 6,240,722. When catalyst ammonia storage amount needs to be established, the heater is turned on to cause ammonia to desorb from brick 123. The amount of ammonia sensed by sensor 124 may be used to infer the axial storage profile of ammonia in brick 121, to be used to update and/or adapt the expected axial storage profile/model via urea injection control. The algorithm for controlling the catalyst in accordance with the present invention is described in more detail below in FIG. 6. In an alternative embodiment (not shown), housing 120 may house several SCR catalyst bricks, each having a small test catalyst and an ammonia sensor coupled in close proximity to it. This way, ammonia storage amounts in each brick can be separately monitored.

Figure 5:
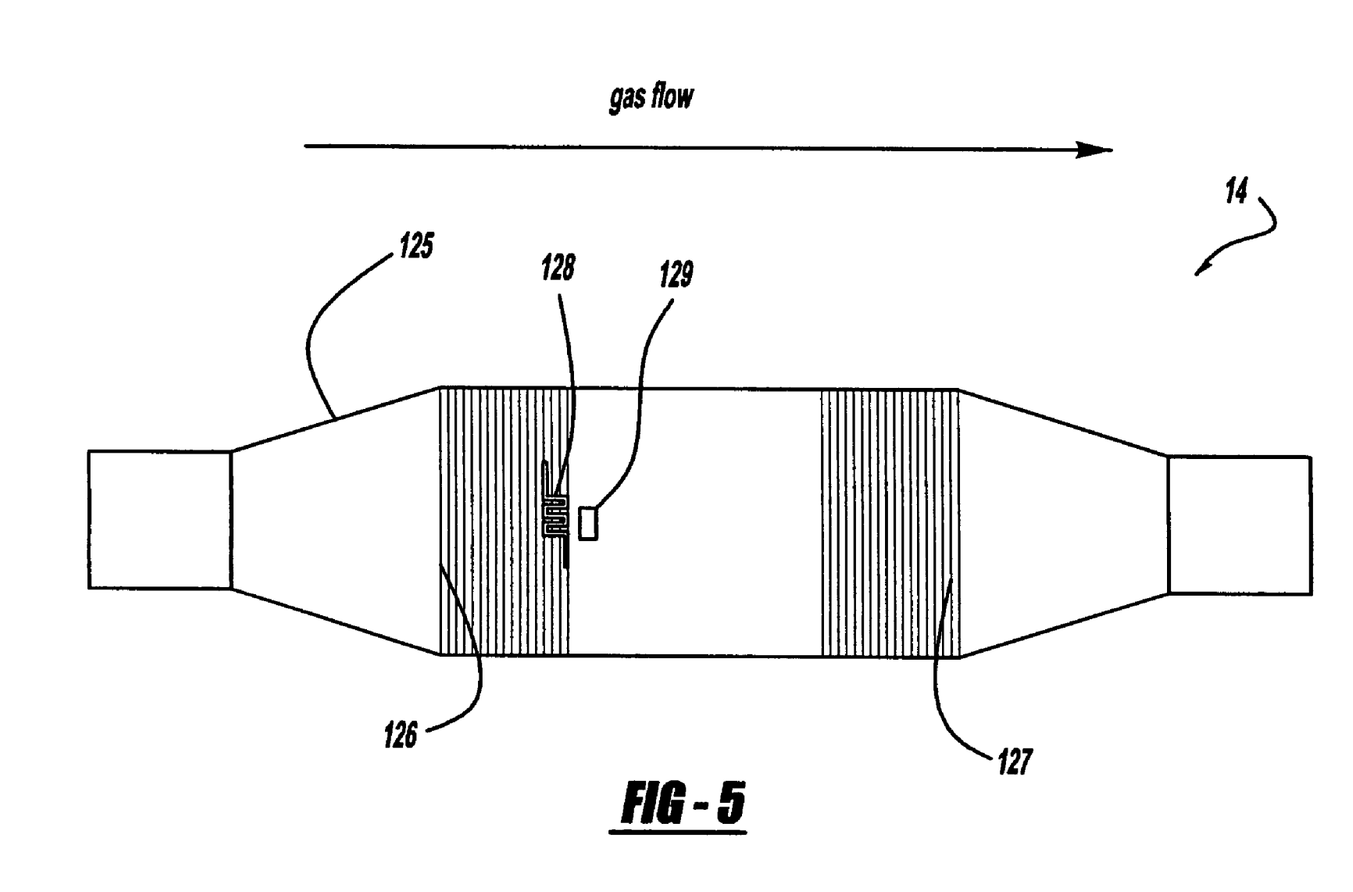

Referring now to FIG. 5, another example of an SCR catalyst system according to the present invention is presented. Catalyst 14 comprises housing 125 wherein SCR catalyst bricks (126, 127) are housed. In a preferred embodiment, brick 126 is approximately 20-30% of overall catalyst volume. SCR catalyst brick 126 has an embedded electrical heater 128 with a temperature probe. In a preferred embodiment, the heated portion is approximately 5% of the volume of brick 126. The heater is located in close proximity to the downstream edge of brick 126. The temperature probe is used to control the maximum temperature of the heated portion of the brick and the rate at which it is being heated up. The maximum heater temperature and its warm-up rate are determined so that enough of ammonia is released from the portion of the brick for the nearby ammonia sensor 129 to reach a predetermined level signal. In an alternative embodiment, the heater could be turned on for a predetermined amount of time and to a predetermined temperature such that all of the ammonia is presumed desorbed from the heated region. Ammonia sensor 129 may be any conventional $NH_3$ sensor known to those skilled in the art, such as the one described in U.S. Pat. No. 6,240,722.

Figure 6:
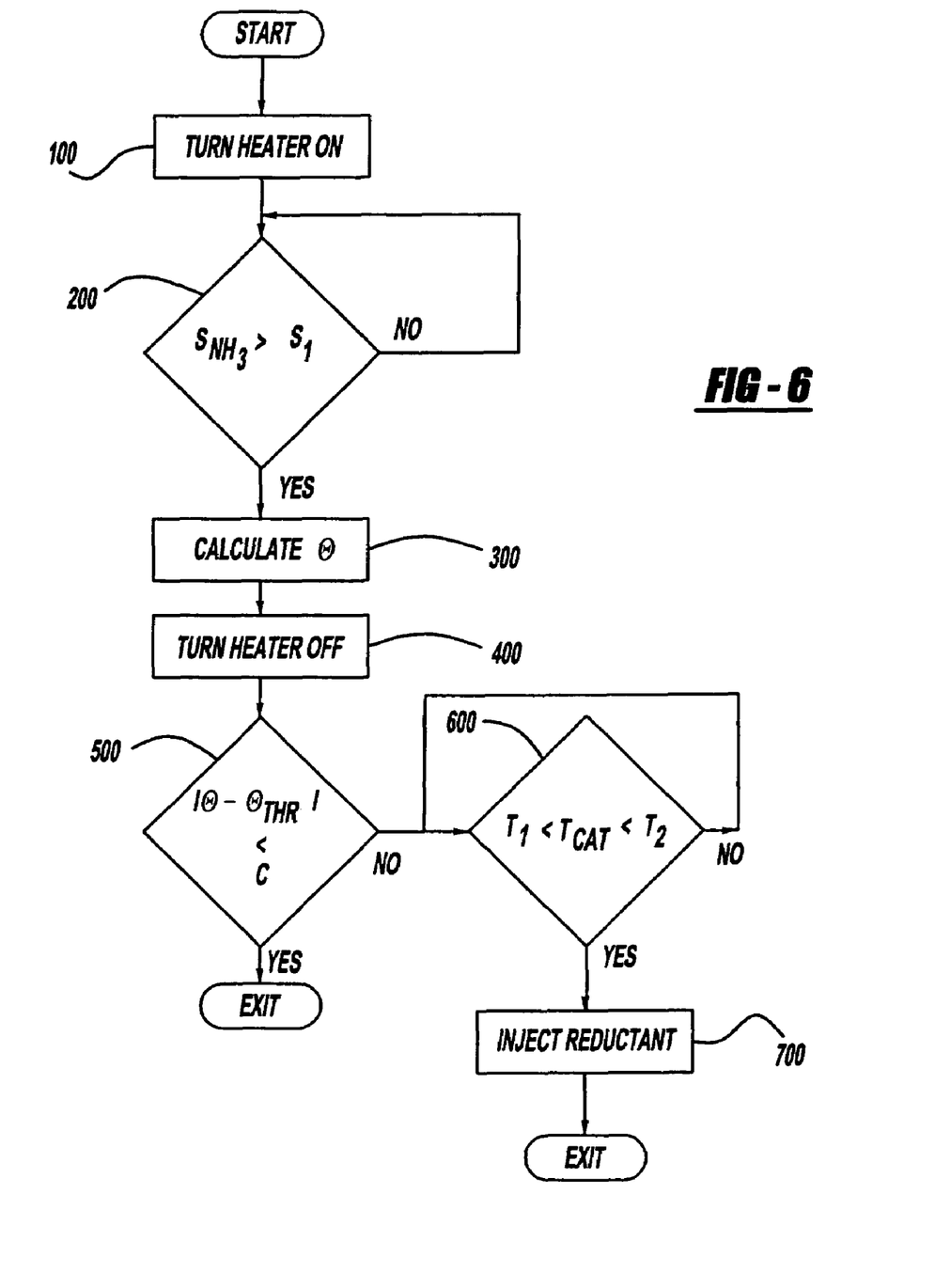
FIGS. 6 and 7 are high level flowcharts of exemplary routines for controlling the emission control system in accordance with the present invention.

Referring now to FIG. 6, a routine for achieving an optimum amount of ammonia storage in the SCR catalyst in accordance with the present invention is presented. In a preferred embodiment, the routine in FIG. 6 is initiated at engine start-up to establish initial amounts of ammonia stored in the catalyst. If the initial ammonia storage is determined to be below optimal, reductant injection may be initiated to achieve optimum storage amounts.

First, in step 100, the embedded heater is turned to desorb stored ammonia from the catalyst portion above the embedded heater.

Next, the routine proceeds to decision block 200 wherein a determination is made whether the ammonia sensor signal $S_{NH_3}$ is greater than a predetermined threshold value $S_1$.

The routine keeps cycling through step 200 until the answer is YES, wherein logic proceeds to step 300. As discussed above with particular reference for FIGS. 3 and 4, the heater may alternatively be turned on for a predetermined time to a predetermined temperature to presumably desorb substantially all of the stored ammonia.

Next, in step 300, the amount of ammonia stored in the catalyst, θ, is established based on the response of the $NH_3$ sensor coupled in close proximity to the heated portion of the catalyst. The amount of ammonia stored is determined based on the following equations:

$$\theta_o^{local} = \frac{\int_0^{t\_end\_TPD} \dot{m}_{NH3\_mes}}{SC(T_{cat}(o))} \quad (1.1)$$

$$\theta_o(x, t) = f_1(x, \theta_o^{local}, T_{cat}(t)) \quad (1.2)$$

$$T_{cat}(x, t) = f_2(T_{cat\_upst}, T_{cat\_dnst}, x, \dot{m}_{exh}, T_{amb}, H) \quad (1.3)$$

Where:

$\theta_o^{local}$ is the initial coverage fraction determined for the heated catalyst portion only (determined at engine on).

$\theta_o(x,t)$ is the coverage fraction over the catalyst length (x) at the given time (t).

f1: is the function that is used to establish the coverage over the catalyst length.

$SC(T_{cat}(o))$ is the total storage capacity of the catalyst at the temperature $T_{cat}(o)$ at engine on, this is established from catalyst characterization experiments.

$T_{cat}(t)$ is the catalyst temperature at some time instance, evaluated from the catalyst temperature model, defined by function "f2" in equation 1.3.

$\dot{m}_{NH3\_mes}$=mass flow rate of ammonia desorbed as measured by the ammonia sensor.

$\dot{m}_{ex}$ is the exhaust gas flow rate.

$T_{cat\_upst}$ exhaust gas temperature upstream of the catalyst $T_{cat\_dnst}$ exhaust gas temperature downstream of the catalyst $T_{amb}$ is the ambient temperature.

H defines the heat transfer coefficient of the catalyst and is specific to the catalyst type.

Once ammonia storage amount is determined, the routine proceeds to step 400 wherein the heater is turned off.

Next, logic flows to decision block 500 wherein a determination is made whether the magnitude of the difference between the θ value determined in step 300 above and $θ_{threshold}$ is within a predetermined constant, C.

If the answer to step 500 is NO, the routine proceeds to step 600 wherein a determination is made whether catalyst temperature, $T_{cat}$, is within a predetermined temperature range ($T_1 < T_{cat} < T_2$). The method for determining catalyst temperature is described in detail with particular reference to FIG. 2 above. When $T_{cat}$ is below a $T_1$ (170° C. in a preferred embodiment), the injected urea may decompose only partially to ammonia and hydrocyanic acid resulting in urea accumulation in the exhaust pipe and/or deposition on the catalyst face. This will lead to inefficient conversion, possible deactivation of the SCR due to polymerized deposits and excess ammonia slip. Therefore, for temperatures below $T_1$, there is no reductant injection into the catalyst. When $T_{cat}$ is above $T_1$, but below a second predetermined temperature threshold, $T_2$ (200° C. in a preferred embodiment), NOx conversion efficiency of the SCR catalyst is very low and reductant may be injected to allow ammonia storage in the catalyst. $θ_{threshold}$ is a desired amount of ammonia storage that is required for improved NOx conversion once the SCR catalyst is within the optimum NOx conversion temperature range (50% in a preferred embodiment).

If the answer to step 600 is NO, the routine keeps cycling until the catalyst temperature reaches the desired range.

If the answer to step 600 is YES, the routine proceeds step 700 wherein a predetermined amount of reductant, $R_{inj}$, is injected into the catalyst to presumably achieve desired ammonia storage amount, $θ_{threshold}$. $R_{inj}$ may be determined from a lookup table as a function of a plurality of operating parameters including engine operating conditions, such as catalyst temperature, engine speed, engine load, EGR level, start of fuel injection (SOI), catalyst temperature, $T_{cat}$, space velocity (SV), concentration of NOx upstream ($C_{NOx\_in}$) and downstream ($C_{NOx\_out}$) of the SCR catalyst, and the calculated amount of ammonia stored in the catalyst, θ, determined in step 300. The routine then exits.

If the answer to step 600 is YES, i.e., the desired amount of ammonia storage is achieved, reductant injection may be discontinued, and the routine then exits.

Therefore, according to the present invention, it is possible to establish ammonia storage amounts in the SCR catalyst at engine startup by desorbing ammonia from a portion of the catalyst brick (or from a small catalyst brick located in close proximity) and monitoring the response of the ammonia sensor to the desorbtion.

Further, when the catalyst is in the desired temperature range, the calculated ammonia storage amount, as well as other operating conditions, can be used to determine the quantity of reductant to be injected in the catalyst such that optimum NOx conversion can be achieved.

In an alternative embodiment (not shown), rather than just at engine start up, ammonia storage amounts in the catalyst can be periodically determined in order to adjust reductant injection amounts such that optimum NOx conversion efficiency can be achieved over vehicle drive cycle.

Figure 7:
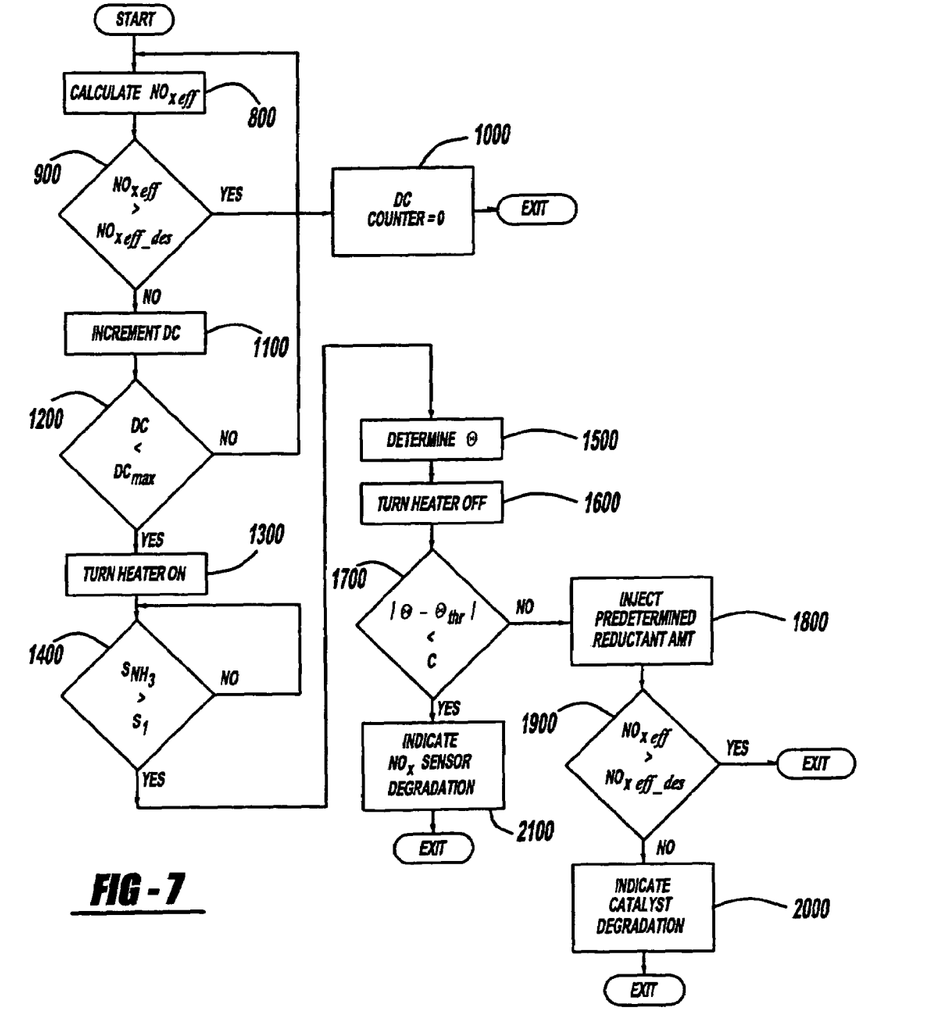

Referring now to FIG. 7, a routine for diagnosing degradation in the SCR catalyst in accordance with the present invention is presented. In a preferred embodiment, this routine is performed once the SCR catalyst if fully warmed up, during normal drive cycle of the vehicle.

First, in step 800 NOx conversion efficiency of the catalyst, $NOx_{eff}$, is calculated. The inventors herein have recognized that since a NOx sensor is cross sensitive to any ammonia that may slip from the catalyst, the downstream NOx sensor reading has to be adjusted based on the ammonia sensor signal. Therefore, NOx conversion efficiency is calculated as follows:

$$NOx_{eff} = \frac{C_{NOx\_out} - \lambda_{nox\_nh3\_fac} \cdot S_{NH_3}}{C_{NOx\_in}}$$

The routine then proceeds to decision block 900 wherein a determination is made whether $NOx_{eff}$ is greater than or equal to desired NOx conversion efficiency, $NOx_{eff\_des}$. If the answer to step 900 is YES, no degradation is detected and the routine proceeds to step 1000 wherein efficiency degradation counter, DC is set to zero. The routine then exits.

If the answer to step 900 is NO, the routine proceeds to step 1100 wherein efficiency degradation counter, DC (initially set to zero), is incremented.

The routine then proceeds to decision block 1200 wherein a determination is made whether the value of the efficiency degradation counter has exceeded a predetermined threshold, $DC_{max}$.

If the answer to step 1100 is NO, the routine cycles back to step 800.

If the answer to step 1200 is YES, indicating degradation in NOx conversion efficiency of the catalyst, the routine proceeds to step 1300 wherein the embedded heater is turned on to desorb ammonia from the catalyst portion above the heater. The temperature of the heater is determined by ammonia desorbtion characteristics of the catalyst, and is adjusted based on operating conditions, such as engine speed, load, exhaust gas temperature, as well as catalyst age.

Next, the routine proceeds to decision block 1400 wherein a determination is made whether the ammonia sensor signal $S_{NH_3}$ is greater that a predetermined threshold value $S_1$. The routine keeps cycling through step 1400 until the answer is YES, wherein logic proceeds to step 1500. As discussed above with particular reference for FIGS. 3 and 4, the heater may alternatively be turned on for a predetermined time to a predetermined temperature to presumably desorb all of the stored ammonia.

Next, in step 1500, the amount of ammonia stored in the catalyst, θ, is established based on the response of the $NH_3$ sensor coupled in close proximity to the heated portion of the catalyst. The amount of ammonia stored is determined same as in Equation 1 of FIG. 6 above adjusted for the catalyst temperature at which the determination was initiated.

Once ammonia storage amount is determined, the routine proceeds to step 1600 wherein the heater is turned off.

The routine then proceeds to step 1700 wherein a determination is made whether the magnitude of the difference between the θ value determined in step 1500 above and $θ_{threshold}$ is within a predetermined constant, C.

If the answer to step 1700 is YES, indicating that ammonia storage amounts in the catalyst are at optimum levels, but NOx conversion efficiency of the catalyst is degraded, the routine proceeds to step 2100 wherein an indication of system degradation such as, for example, NOx sensor degradation or injection system degradation is generated. The routine then exits.

If the answer to step 1700 is NO, the routine proceeds to step 1800 wherein a predetermined amount of reductant, $R_{inj}$, (in addition to the requisite feed-forward amount for NOx reduction), is injected into the catalyst to presumably achieve desired ammonia storage amount, $\theta_{threshold}$. $R_{inj}$ is determined in the same manner as described in step 700 FIG. 6 above.

The routine then proceeds to decision block 1900 wherein a determination is made whether $NOx_{eff}$ is greater than or equal to desired NOx conversion efficiency, $NOx_{eff\_des}$. If the answer to step 1900 is YES, indicating that degradation in NOx conversion efficiency was due to insufficient ammonia storage in the catalyst, and has now been corrected, the routine exits.

If the answer to step 1900 is NO, indicating that degradation in NOx conversion efficiency of the catalyst has not been corrected by extra reductant injection, the routine proceeds to step 2000, wherein an indication of catalyst deterioration due to, for example, hydrocarbon poisoning, is generated. The routine then exits.

Therefore, according to the present invention, it is possible to improve performance of the vehicle emission control system by monitoring and controlling ammonia storage amount in the SCR catalyst.

If degradation in NOx conversion efficiency of the catalyst is indicated, the present invention teaches intrusively desorbing a portion of the ammonia stored in the catalyst to determine the overall ammonia storage amount. If the ammonia storage amount in the catalyst is at optimum level, but NOx conversion efficiency is still degraded, determination can be made that one of the NOx sensors is degraded, and corrective action can be taken.

Further, using the present invention, it is also possible to determine that catalyst performance is degraded due to hydrocarbon poisoning. In other words, if it is not possible to increase ammonia storage amount in the catalyst through extra reductant injection, a determination can be made that its storage capacity is decreased due to hydrocarbon poisoning. Therefore, catalyst regeneration routine can be initiated.

In an alternative embodiment (not shown), upon indication of NOx conversion efficiency degradation, the intrusive desorption can be initiated and the difference between the actual amount of ammonia stored and the desired storage amount determined based on the sensor response. Based on this difference, an amount of reductant presumably sufficient to achieve desired ammonia storage amount can be injected into the catalyst. Catalyst degradation will be indicated if the amount of ammonia slip past the first catalyst brick is greater than a predetermined value as indicated by the ammonia sensor coupled in the vicinity of the first brick.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. An exhaust gas aftertreatment system for an internal combustion engine, comprising:
   an SCR catalyst comprising:
     a first brick;
     a second brick having an embedded heater, said second brick being substantially smaller than said first brick; and
     a reductant sensor coupled in close proximity to said second brick;
   a reductant injector coupled upstream of said SCR catalyst; and
   a controller adjusting a temperature of said embedded heater thereby releasing substantially all reductant stored on said second brick, and adjusting an amount reductant injected into said SCR catalyst based on a change in a reductant sensor reading due to said reductant release from said second brick.

2. A method for controlling a NOx-reducing catalyst coupled downstream of an internal combustion engine, the NOx-reducing catalyst including an embedded heater and an ammonia sensor coupled in close proximity to the embedded heater, the method comprising:
   providing an indication of catalyst degradation;
   in response to said indication, turning on the heater thereby causing a portion of reductant to desorb from the catalyst; and
   subsequently injecting a predetermined amount of reductant into the catalyst, said predetermined amount based on a response of the ammonia sensor to reductant desorbtion.

3. The method as set forth in claim 2 wherein said catalyst degradation is NOx conversion efficiency degradation.

4. The method as set forth in claim 3 further comprising determining an amount of reductant stored in the catalyst based on said sensor response to said reductant desorbtion.

5. The method as stored in claim 4 further comprising calculating NOx conversion efficiency of the catalyst subsequent to said injection of said predetermined amount of reductant.

6. The method as set forth in claim 5, further comprising providing an indication of system degradation if said calculated NOx conversion efficiency is below a predetermined value.

7. The method as set forth in claim 6 further comprising regenerating the catalyst based on said indication of system degradation.

* * * * *